(12) United States Patent
Shibai

(10) Patent No.: US 11,577,551 B2
(45) Date of Patent: *Feb. 14, 2023

(54) PNEUMATIC TIRE

(71) Applicant: The Yokohama Rubber Co., LTD., Tokyo (JP)

(72) Inventor: Takashi Shibai, Hiratsuka (JP)

(73) Assignee: The Yokohama Rubber Co., Ltd., Tokyo (JP)

( * ) Notice: Subject to any disclaimer, the term of this patent is extended or adjusted under 35 U.S.C. 154(b) by 219 days.

This patent is subject to a terminal disclaimer.

(21) Appl. No.: 16/071,863

(22) PCT Filed: Jan. 11, 2017

(86) PCT No.: PCT/JP2017/000560
§ 371 (c)(1),
(2) Date: Jul. 20, 2018

(87) PCT Pub. No.: WO2017/126375
PCT Pub. Date: Jul. 27, 2017

(65) Prior Publication Data
US 2019/0030957 A1    Jan. 31, 2019

(30) Foreign Application Priority Data

Jan. 21, 2016  (JP) .............................. JP2016-009631

(51) Int. Cl.
*B60C 11/13* (2006.01)
*B60C 11/04* (2006.01)
(Continued)

(52) U.S. Cl.
CPC .......... *B60C 11/042* (2013.01); *B60C 11/032* (2013.01); *B60C 11/0304* (2013.01);
(Continued)

(58) Field of Classification Search
CPC ............ B60C 2011/0381; B60C 11/04; B60C 2011/0386; B60C 2011/0388; B60C 11/042
See application file for complete search history.

(56) References Cited

U.S. PATENT DOCUMENTS

2008/0092999 A1* 4/2008 Miyazaki .............. B60C 11/032
152/209.15
2010/0252159 A1  10/2010 Mukai
(Continued)

FOREIGN PATENT DOCUMENTS

| CN | 101856954 | 10/2010 |
|---|---|---|
| JP | 2007-331412 | 12/2007 |

(Continued)

OTHER PUBLICATIONS

Point Reflection https://web.archive.org/web/20151128121719/https://en.wikipedia.org/wiki/Point_reflection (Year: 2015).*
(Continued)

*Primary Examiner* — Timothy Kennedy
*Assistant Examiner* — Farah Taufiq
(74) *Attorney, Agent, or Firm* — Thorpe North & Western

(57) ABSTRACT

A pneumatic tire is provided, the pneumatic tire including a tread portion, sidewall portions, and bead portions, and the pneumatic tire includes, in the tread portion, a center main groove extending in a tire circumferential direction and a shoulder main groove extending in the tire circumferential direction on the outside of the center main groove; a land portion between the main grooves; lug grooves extending inward in a tire lateral direction from the shoulder main groove and terminating without communicating with the center main groove; a bent portion bending toward one side in the tire circumferential direction, at a terminating end of each of the lug grooves; and a raised bottom portion included in the bent portion, creating a level difference with (Continued)

respect to a lug groove, and being shallower than the lug groove.

12 Claims, 6 Drawing Sheets

(51) Int. Cl.
*B60C 11/03* (2006.01)
*B60C 11/01* (2006.01)
*B60C 11/12* (2006.01)

(52) U.S. Cl.
CPC .......... *B60C 11/13* (2013.01); *B60C 11/1376* (2013.01); *B60C 11/01* (2013.01); *B60C 11/0302* (2013.01); *B60C 11/1204* (2013.01); *B60C 2011/0341* (2013.01); *B60C 2011/0346* (2013.01); *B60C 2011/0348* (2013.01); *B60C 2011/0351* (2013.01); *B60C 2011/0372* (2013.01); *B60C 2011/0381* (2013.01); *B60C 2011/0388* (2013.01); *B60C 2011/1213* (2013.01)

(56) References Cited

U.S. PATENT DOCUMENTS

| 2012/0273104 | A1 | 11/2012 | Ishida | |
|---|---|---|---|---|
| 2013/0167997 | A1* | 7/2013 | Hayashi | B60C 11/0306 |
| | | | | 152/209.18 |
| 2014/0305559 | A1* | 10/2014 | Takemoto | B60C 11/0304 |
| | | | | 152/209.8 |
| 2017/0008346 | A1* | 1/2017 | Kubo | B60C 11/0302 |

FOREIGN PATENT DOCUMENTS

| JP | 2010-215172 | | 9/2010 |
|---|---|---|---|
| JP | 2012-171478 A | | 9/2012 |
| JP | 2012-171479 A | | 9/2012 |
| JP | 2012171479 A | * | 9/2012 |
| JP | 2012-228992 | | 11/2012 |
| JP | 2014-205410 | | 10/2014 |
| JP | 2015-016839 | | 1/2015 |
| JP | 2015-71373 A | | 4/2015 |
| JP | 2015071373 A | * | 4/2015 |
| JP | 2015-140046 | | 8/2015 |
| JP | 2015-166243 | | 9/2015 |
| JP | 2016-002859 | | 1/2016 |
| WO | WO 2015/111302 | | 7/2015 |

OTHER PUBLICATIONS

International Search Report for International Application No. PCT/JP2017/000560 dated Apr. 11, 2017, 4 pages, Japan.

* cited by examiner

PNEUMATIC TIRE

TECHNICAL FIELD

The present technology relates to pneumatic tires including center main grooves extending in a tire circumferential direction, shoulder main grooves extending in the tire circumferential direction on the outside of the center main grooves, and land portions extending in the tire circumferential direction between the center main grooves and the shoulder main grooves in tread portions, and more specifically, relates to pneumatic tires that have improved uneven wear resistance while achieving good steering stability on dry road surfaces and wet road surfaces, which are in a negative correlation, in a compatible manner by appropriately setting configurations of tread patterns.

BACKGROUND ART

Pneumatic tires use a tread pattern in which a plurality of main grooves extending in a tire circumferential direction and rows of land portions defined by the main grooves are formed in a tread portion (for example, see Japanese Unexamined Patent Publication No. 2012-228992). In such pneumatic tires, a plurality of lug grooves extending in a tire lateral direction are formed in the land portions in the tread portion to ensure excellent drainage performance through the lug grooves.

However, when the number of lug grooves in the tread portion increases, the rigidity of the tread portion decreases, and thus steering stability on dry road surfaces declines. On the other hand, when the number of lug grooves in the tread portion decreases, the drainage performance decreases, and thus steering stability on wet road surfaces declines. In this manner, the steering stability on dry road surfaces and the steering stability on wet road surfaces are in a negative correlation, and, consequently, it is difficult to improve both the steering stability on dry road surfaces and the steering stability on wet road surfaces at the same time.

Additionally, when the tread portion is subdivided by the main grooves and the lug grooves, the rigidity of the tread portion is made nonuniform, causing uneven wear in the tread portion readily. Since there are some restrictions on the layout of the main grooves and the lug grooves to suppress uneven wear, it is more difficult to improve uneven wear resistance while achieving good steering stability on dry road surfaces and wet road surfaces in a compatible manner.

SUMMARY

The present technology provides a pneumatic tire that has improved uneven wear resistance while achieving good steering stability on dry road surfaces and wet road surfaces, which are in a negative correlation, in a compatible manner by appropriately setting a configuration of a tread pattern.

A pneumatic tire according to an aspect of the present technology includes a tread portion having an annular shape and extending in a tire circumferential direction, a pair of sidewall portions disposed on both sides of the tread portion, and a pair of bead portions disposed inward of the sidewall portions in a tire radial direction, the pneumatic tire including: a center main groove extending in the tire circumferential direction and a shoulder main groove extending in the tire circumferential direction on the outside of the center main groove, formed in the tread portion; a land portion defined between the center main groove and the shoulder main groove; a plurality of lug grooves disposed in the land portion, extending inward in a tire lateral direction from the shoulder main groove, and terminating without communicating with the center main groove; a bent portion bending toward one side in the tire circumferential direction, at a terminating end of each of the plurality of lug grooves; and a raised bottom portion included in the bent portion, creating a level difference with respect to a lug groove, and being shallower than the lug groove.

In the present technology, the center main groove extending in the tire circumferential direction and the shoulder main groove extending in the tire circumferential direction on the outside of the center main groove formed in the tread portion and the plurality of lug grooves formed in the land portion defined between the center main groove and the shoulder main groove ensure steering stability on wet road surfaces. Moreover, the lug grooves terminating within the land portion sufficiently ensure the rigidity of the land portion while providing good steering stability on dry road surfaces and that on wet road surfaces in a compatible manner. Furthermore, the bent portion formed in the lug groove extending inward in the tire lateral direction from the shoulder main groove can increase the effect of enhancing wet performance through the edge effect of the bent portions. Additionally, the raised bottom portion in the bend portion, for creating a level difference with respect to the lug grooves and being shallower than the lug grooves, prevent a local decrease in rigidity of the land portion, resulting in enhancement of steering stability on dry road surfaces and uneven wear resistance. In this way, good steering stability on dry road surfaces and wet road surfaces, which are in a negative correlation, are achieved in a compatible manner, and furthermore, uneven wear resistance is improved at the same time.

In the present technology, a depth $Dx$ of the bent portion at the raised bottom portion and a depth $Dr$ of the lug groove preferably satisfy a relationship of $0.10 \times Dr \leq Dx \leq 0.70 \times Dr$. Setting the depth $Dx$ of the bent portion at the raised bottom portion in the above-described range effectively enhances steering stability on dry road surfaces and uneven wear resistance while reliably ensuring the effect of enhancing wet performance.

Additionally, the center main groove preferably has a zigzag shape extending in the tire circumferential direction, a plurality of narrow grooves preferably intermittently extend in the tire circumferential direction in the land portion without communicating with the bent portion, and the narrow grooves are preferably substantially parallel with the center main groove having the zigzag shape. The center main groove having the zigzag shape and the narrow grooves intermittently disposed to be substantially parallel with the center main groove provide good steering stability on dry road surfaces and wet road surfaces in a highly compatible manner, and can further enhance uneven wear resistance.

Additionally, a depth $Ds$ of the narrow grooves and a depth $Dc$ of the center main groove having the zigzag shape preferably satisfy a relationship of $0.10 \times Dc \leq Ds \leq 0.50 \times Dc$. Setting the depth $Ds$ of the narrow grooves in the above-described range effectively enhances steering stability on dry road surfaces and uneven wear resistance.

Furthermore, a gap $d1$ between the narrow grooves and the center main groove having the zigzag shape in a tire axial direction and a width $d2$ of the land portion in the tire axial direction preferably satisfy a relationship of $0.10 \times d2 \leq d1 \leq 0.40 \times d2$. Setting the gap $d1$ between the narrow grooves and the center main groove having the zigzag shape in the above-described range maximizes the effect of enhancing uneven wear resistance.

Furthermore, an inclination angle α of the lug grooves each having the bent portion with respect to the tire circumferential direction is preferably within a range of from 25° to 75°. Setting the inclination angle α of the lug grooves with respect to the tire circumferential direction in the above-described range reliably ensures the effect of enhancing steering stability on dry road surfaces.

DETAILED DESCRIPTION

The configuration of the present technology is described in detail below with reference to the accompanying drawings. FIGS. 1 to 6 illustrate a pneumatic tire according to an embodiment of the present technology.

Figure 1:
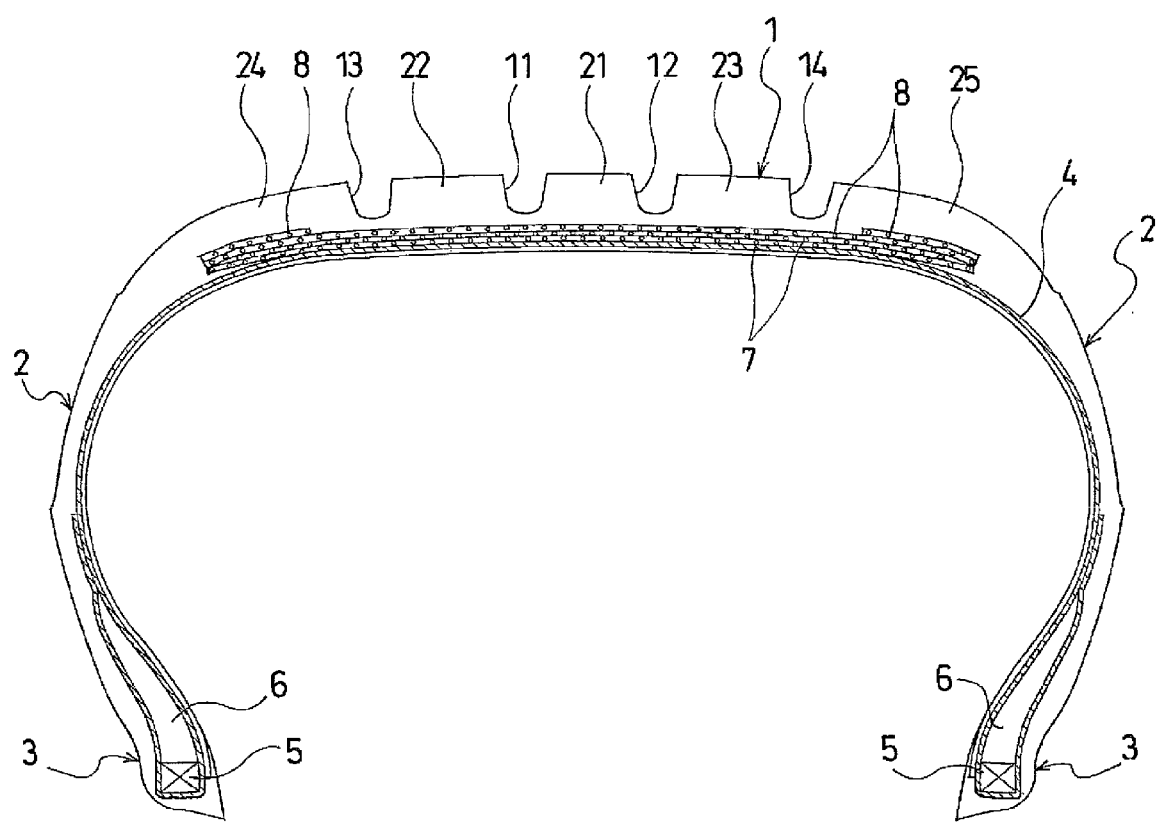
FIG. 1 is a meridian cross-sectional view illustrating a pneumatic tire according to an embodiment of the present technology.

As illustrated in FIG. 1, a pneumatic tire of the present embodiment includes an annular tread portion 1 extending in the tire circumferential direction, a pair of sidewall portions 2, 2 disposed on both sides of the tread portion 1, and a pair of bead portions 3, 3 disposed inward of the sidewall portions 2 in the tire radial direction.

A carcass layer 4 is mounted between the pair of bead portions 3, 3. The carcass layer 4 includes a plurality of reinforcing cords extending in the tire radial direction and is folded back around bead cores 5 disposed in each of the bead portions 3 from a tire inner side to a tire outer side. A bead filler 6 having a triangular cross-sectional shape formed from rubber composition is disposed on a periphery of the bead core 5.

On the other hand, a plurality of belt layers 7 are embedded on an outer circumferential side of the carcass layer 4 in the tread portion 1. These belt layers 7 include a plurality of reinforcing cords that incline with respect to the tire circumferential direction and the direction of the reinforcing cords of the different layers intersect each other. In the belt layers 7, an inclination angle of the reinforcing cords with respect to the tire circumferential direction ranges from, for example, 10° to 40°. Steel cords are preferably used as the reinforcing cords of the belt layers 7. For the purpose of improving high-speed durability, at least one layer of a belt cover layer 8 formed by arranging reinforcing cords at an angle of, for example, not greater than 5° with respect to the tire circumferential direction, is disposed on an outer circumferential side of the belt layers 7. Nylon, aramid, or similar organic fiber cords are preferably used as the reinforcing cords of the belt cover layer 8.

Note that the tire internal structure described above is exemplary of a pneumatic tire, but is not limited thereto.

Figure 2:
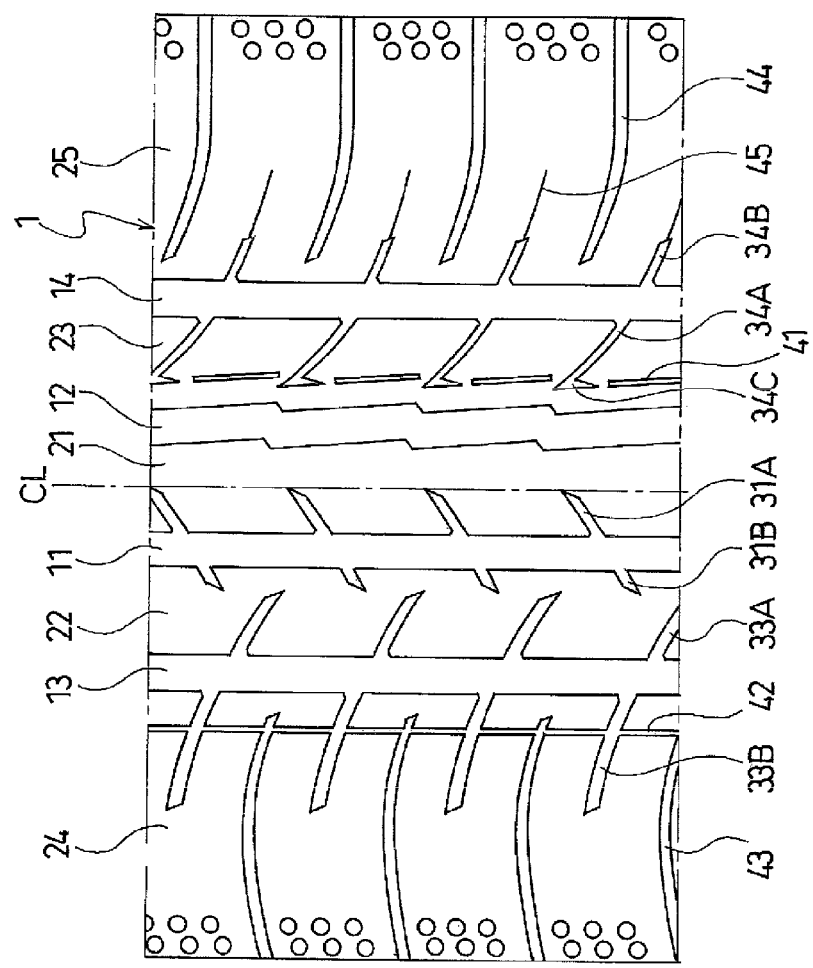
FIG. 2 is a developed view illustrating a tread pattern of the pneumatic tire in FIG. 1.

As illustrated in FIG. 2, four main grooves 11 to 14 extending in the tire circumferential direction are formed in the tread portion 1. In other words, a pair of center main grooves 11 and 12 located on both sides of a tire equator CL and a pair of shoulder main grooves 13 and 14 located on the outer sides of the center main grooves 11 and 12, respectively, in the tire lateral direction are formed in the tread portion 1. Herein, the center main groove 12 forms a zigzag shape extending in the tire circumferential direction, and the other main grooves 11, 13, and 14 form straight lines. These four main grooves 11 to 14 define a center land portion 21 located on the tire equator CL, an intermediate land portion 22 located on one side of the center land portion 21 in the tire lateral direction, an intermediate land portion 23 located on the other side of the center land portion 21 in the tire lateral direction, a shoulder land portion 24 located on the one side of the intermediate land portion 22 in the tire lateral direction, and a shoulder land portion 25 located on the other side of the intermediate land portion 23 in the tire lateral direction in the tread portion 1.

Additionally, a plurality of lug grooves 31A, 31B, 33A, 33B, 34A, and 34B, extending from the main grooves 11, 13, and 14, except the zigzag-shaped center main groove 12, toward both sides in the tire lateral direction and terminating within the respective land portions 21 to 25, are formed in the tread portion 1 with an interval between each other in the tire circumferential direction.

More specifically, one end of each lug groove 31A communicates with the center main groove 11, whereas the other end terminates within the center land portion 21, and one end of each lug groove 31B communicates with the center main groove 11, whereas the other end terminates within the intermediate land portion 22. One end of each lug groove 33A communicates with the shoulder main groove 13, whereas the other end terminates within the intermediate land portion 22, and one end of each lug groove 33B communicates with the shoulder main groove 13, whereas the other end terminates within the shoulder land portion 24. One end of each lug groove 34A communicates with the shoulder main groove 14, whereas the other end terminates within the intermediate land portion 23, and one end of each lug groove 34B communicates with the shoulder main groove 14, whereas the other end terminates within the shoulder land portion 25.

Note that the lug grooves 31A and the lug grooves 31B preferably oppose each other. However, the lug grooves 31A and the lug grooves 31B may be shifted in the tire circumferential direction to, for example, alleviate pattern noise. This relationship applies to the layout of the lug grooves 33A and the lug grooves 33B and the layout of the lug grooves 34A and the lug grooves 34B.

Figure 3:
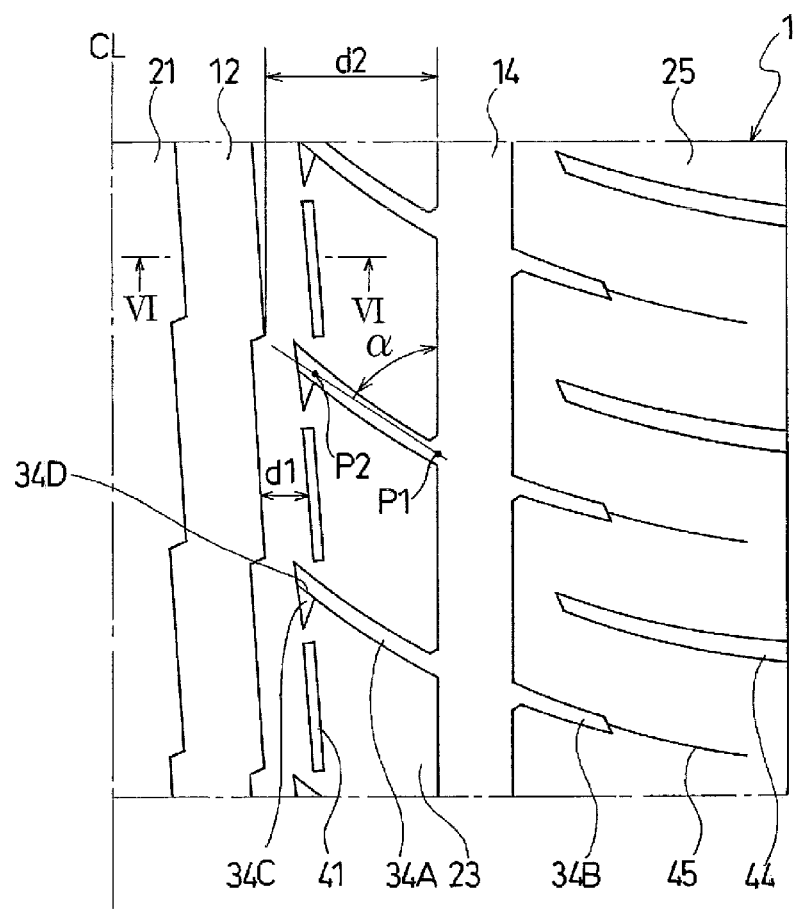
FIG. 3 is a plan view illustrating the main parts of the tread pattern in FIG. 2.
Figure 4:
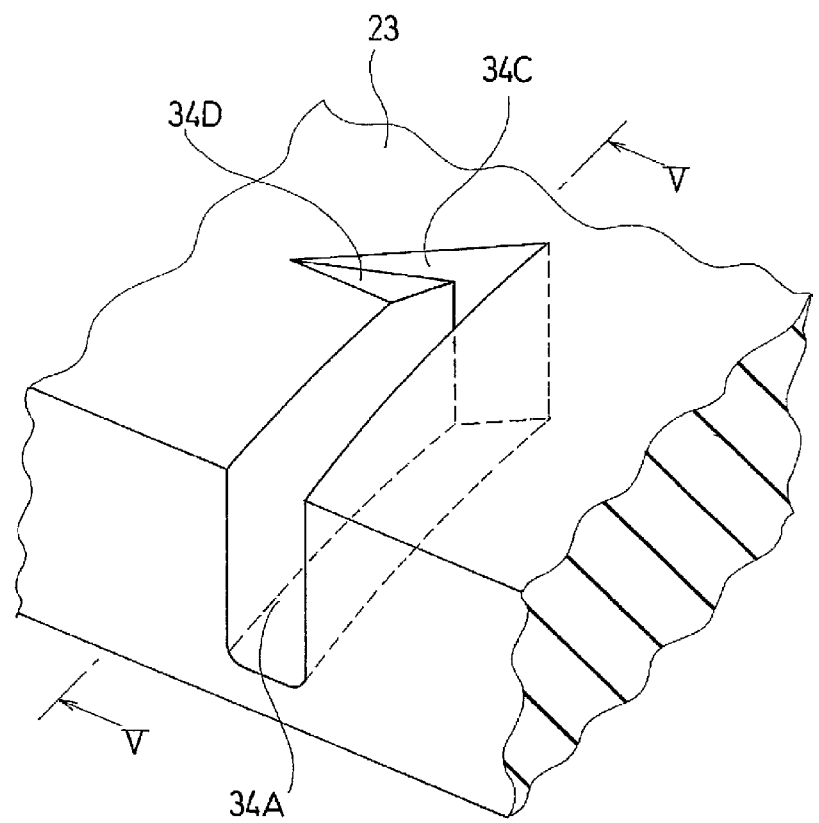
FIG. 4 is a perspective view illustrating a lug groove having a bent portion in the tread pattern in FIG. 2.
Figure 5:
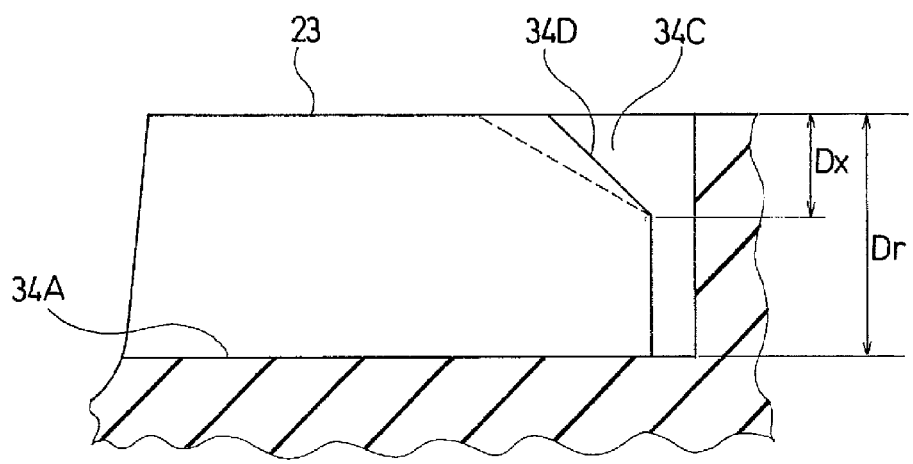
FIG. 5 is a cross-sectional view taken along line V-V of FIG. 4.
Figure 6:
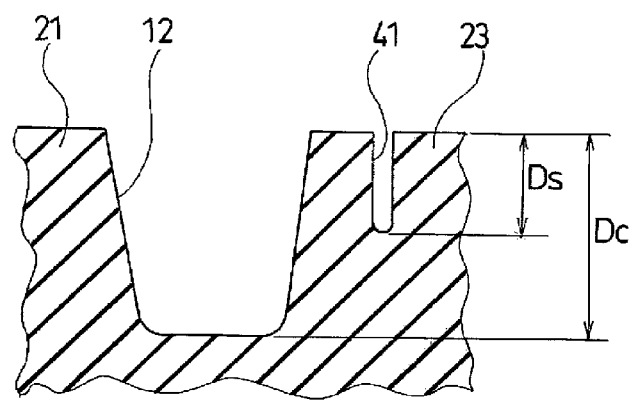
FIG. 6 is a cross-sectional view taken along line VI-VI of FIG. 3.

As illustrated in FIGS. 3 to 5, in the intermediate land portion 23, each of the lug grooves 34A extending inward from the shoulder main groove 14 in the tire lateral direction includes a hook-shaped bent portion 34C bending toward one side in the tire circumferential direction at the terminating end of the lug groove 34A. Furthermore, the bent portion 34C includes a raised bottom portion 34D creating a level difference with respect to the lug groove 34A and being shallower than the lug groove 34A. The height of the raised bottom portion 34D increases toward the end of the bent portion 34C. In other words, the bent portion 34C becomes shallower toward its distal end. Additionally, a plurality of narrow grooves 41 intermittently extending in the tire circumferential direction without communicating with the bent portions 34C are formed in the intermediate land portion 23, in which the lug grooves 34A including the bent portions 34C are formed. The narrow grooves 41 have a width of 3.0 mm or less, and encompass so-called sipes.

These narrow grooves 41 are disposed substantially parallel with the zigzag-shaped center main groove 12.

The narrow grooves 41 are not necessarily strictly parallel with the center main groove 12. When a relationship of $(d1_{max}-d1_{min})/d1_{max} \leq 0.1$ is satisfied, where a minimum value $d1_{min}$ and a maximum value $d1_{max}$ of a gap d1 between the narrow grooves 41 and the center main groove 12 in the tire axial direction are measured, the narrow grooves 41 and the center main groove 12 can be regarded as substantially parallel with each other.

A circumferential auxiliary groove 42 extending in the tire circumferential direction is formed in the shoulder land portion 24. The circumferential auxiliary groove 42 has a width ranging of from 0.8 mm to 3.0 mm. Moreover, a plurality of shoulder lug grooves 43 extending inward in the tire lateral direction from an end portion of the tread portion 1 are formed in the shoulder land portion 24 with an interval between each other in the tire circumferential direction. The shoulder lug grooves 43 intersect the circumferential auxiliary groove 42, and terminate before reaching the shoulder main groove 13.

A plurality of shoulder lug grooves 44 extending inward in the tire lateral direction from the other end portion of the tread portion 1 are formed in the shoulder land portion 25 with an interval between each other in the tire circumferential direction. The shoulder lug grooves 44 terminate before reaching the shoulder main groove 14. A plurality of sipes 45 each extending outward in the tire lateral direction from the end portion of the corresponding lug groove 34B are also formed in the shoulder land portion 25.

The pneumatic tire described above includes the center main groove 12 extending in the tire circumferential direction and the shoulder main groove 14 extending in the tire circumferential direction on the outside of the center main groove 12 formed in the tread portion 1 and the plurality of lug grooves 34A formed in the intermediate land portion 23 between the center main groove 12 and the shoulder main groove 14, thereby ensuring steering stability on wet road surfaces. Furthermore, the bent portions 34C formed in the lug grooves 34A extending inward in the tire lateral direction from the shoulder main groove 14 increase an effect of enhancing wet performance through the edge effect of the bent portions. Additionally, the raised bottom portions 34D formed in the bent portions 34C, for creating a level difference with respect to the lug grooves 34A and being shallower than the lug grooves 34A prevent a local decrease in rigidity of the intermediate land portion 23, resulting in enhancement of steering stability on dry road surfaces and uneven wear resistance.

In the pneumatic tire described above, as illustrated in FIG. 5, a depth Dx of the bent portion 34C at the raised bottom portion 34D and a depth Dr of the lug groove 34A preferably satisfy a relationship of $0.10 \times Dr \leq Dx \leq 0.70 \times Dr$. Setting the depth Dx of the bent portion 34C at the raised bottom portion 34D in the above-described range effectively enhances steering stability on dry road surfaces and uneven wear resistance while reliably ensuring the effect of enhancing wet performance. In a case where the ratio Dx/Dr is less than 0.10, the effect of enhancing wet performance decreases, whereas in a case where the ratio is greater than 0.70, the rigidity of the land portion 23 decreases, and thus adversely affects steering stability on dry road surfaces and uneven wear resistance. Note that when the depth of the bent portion 34C at the raised bottom portion 34D gradually changes as illustrated in FIG. 5, the depth Dx means the maximum depth of the bent portion 34C at the raised bottom portion 34D.

Moreover, in the pneumatic tire described above, it is desirable that the center main groove 12 forms a zigzag shape extending in the tire circumferential direction, that the plurality of narrow grooves 41 intermittently extend in the tire circumferential direction in the intermediate land portion 23 without communicating with the bent portions 34C, and that these narrow grooves 41 are substantially parallel with the zigzag-shaped center main groove 12. The zigzag-shaped center main groove 12 contributes to an improvement in steering stability on wet road surfaces through the edge effect thereof. Additionally, the narrow grooves 41 intermittently disposed substantially parallel with the center main groove 12 minimize a decrease in rigidity of the intermediate land portion 23, and at the same time, contribute to an improvement in steering stability on wet road surfaces through the edge effect thereof. Consequently, a combination of the zigzag-shaped center main groove 12 and the narrow grooves 41 provides good steering stability on dry road surfaces and wet road surfaces in a highly compatible manner, and further enhances uneven wear resistance. Additionally, the raised bottom portions 34D formed in the bent portions 34C prevent cracks that may connect between the narrow grooves 41 and the bent portions 34C while the tire is being used.

In the pneumatic tire described above, as illustrated in FIG. 3, an inclination angle α of the lug grooves 34A having the bent portions 34C with respect to the tire circumferential direction is preferably within a range of from 25° to 75°. Setting the inclination angle α of the lug grooves 34A with respect to the tire circumferential direction in the above-described range reliably ensures the effect of enhancing steering stability on dry road surfaces. In a case where the inclination angle α is less than 25°, acute-angled portions are formed in the land portion 23 and cause a local decrease in rigidity and, thus adversely affect steering stability on dry road surfaces, In contrast, in a case where the inclination angle α is greater than 75°, behavior of portions at both sides of the lug grooves 34A becomes uncorrelated, leading to a decrease in rigidity as a pattern, and thus adversely affect the steering stability on the dry road surfaces. Note that the inclination angle α of the lug grooves 34A denotes an angle of a straight line connecting center positions P1 and P2 in the width direction at both ends in the longitudinal direction of the lug grooves 34A, excluding the bent portions 34C, with respect to the tire circumferential direction.

Additionally, in the pneumatic tire described above, as illustrated in FIG. 6, a depth Ds of the narrow grooves 41 and a depth Dc of the zigzag-shaped center main groove 12 preferably satisfy a relationship of $0.10 \times Dc \leq Ds \leq 0.50 \times Dc$. Setting the depth Ds of the narrow grooves 41 in the above-described range effectively enhances steering stability on dry road surfaces and uneven wear resistance. In a case where the ratio Ds/Dc is less than 0.10, the effect of enhancing uneven wear resistance decreases. However, in a case where the ratio is greater than 0.50, the rigidity of the land portion 23 decreases, and thus steering stability on dry road surfaces is adversely affected.

Furthermore, in the pneumatic tire described above, the gap d1 between the narrow grooves 41 and the zigzag-shaped center main groove 12 in the tire axial direction and a width d2 of the land portion 23 in the tire axial direction preferably satisfy a relationship of $0.10 \times d2 \leq d1 \leq 0.40 \times d2$. Setting the gap d1 between the narrow grooves 41 and the zigzag-shaped center main groove 12 in the above-described range maximizes the effect of enhancing uneven wear resistance. In a case where the ratio d1/d2 falls outside the above-described range, the rigidity of the land portion 23 cannot be made sufficiently uniform, and thus the effect of enhancing uneven wear resistance decreases. Note that the width d2 of the land portion 23 is the smallest width of the land portion 23 adjacent to the zigzag-shaped center main groove 12, and that the gap d1 is defined as an average value of a smallest value $d1_{min}$ and a maximum value $d1_{max}$ of the gap d1 between the narrow grooves 41 and the center main groove 12 when the gap d1 changes.

Additionally, in the pneumatic tire described above, the plurality of lug grooves 31A, 31B, 33A, 33B, 34A, and 34B formed in the tread portion 1, extending from the main grooves 11, 13, and 14, except the zigzag-shaped center main groove 12, toward both sides in the tire lateral direction and terminating within the corresponding land portions 21 to 25, ensure excellent drainage performance while minimizing a decrease in rigidity of the tread portion 1. In other words, the lug grooves 31A, 31B, 33A, 33B, 34A, and 34B deliver efficient drainage performance by guiding water on road surfaces to the respective center main grooves 11, 13, and 14, and at the same time, maintain high rigidity of the tread portion 1 by not completely separating the land portions 21 to 25 from each other. Thus, good steering stability on dry road surfaces and wet road surfaces can be provided in a highly compatible manner. In the embodiment described above, the pair of center main grooves 11 and 12 and the pair of shoulder main grooves 13 and 14 are formed in the tread portion 1, and the center main groove 12 has a zigzag shape extending in the tire circumferential direction. However, in the present technology, both the center main grooves 11 and 12 may have zigzag shapes extending in the tire circumferential direction. For example, the configuration of the tread pattern in the right part of the tire equator CL in FIG. 2 may be applicable to the left part of the tire equator CL, in a mirror symmetry or point symmetry. Further, as long as the tread pattern has the configuration of the right part in FIG. 2, the configuration of the left part may be optionally selectable. Additionally, in non-ideal embodiments of the present technology, the center main groove 12 may have a straight line shape as do the other main grooves 11, 13, and 14, or the narrow grooves 41 may be removed from the land portion 23.

Pneumatic tires of Examples 1 to 9 having a tire size of 215/55R17 each including a tread portion, a pair of sidewall portions, and a pair of bead portions were produced. As illustrated in FIG. 2, four main grooves including a pair of center main grooves extending in the tire circumferential direction and a pair of shoulder main grooves each extending in the tire circumferential direction on the outside of the corresponding center main groove were formed in the tread portion. Five land portions were defined by the main grooves. One of the center main grooves had a zigzag shape extending in the tire circumferential direction, and the other main grooves had a straight line shape. A plurality of lug grooves were formed in the land portion between the zigzag-shaped center main groove and the adjacent shoulder main groove such that the lug grooves extended inward in the tire lateral direction from the shoulder main groove and terminated without communicating with the center main groove. Each of the lug grooves had a bent portion bending toward one side in the tire circumferential direction at the terminating end thereof, and each of the bent portions had a raised bottom portion creating a level difference with respect to the corresponding lug groove and being shallower than the lug groove. A plurality of narrow grooves intermittently extending in the tire circumferential direction without communicating with the bent portions were formed in the land portion. The narrow grooves were disposed substantially parallel with the zigzag-shaped center main groove.

For comparison, a tire of Conventional Example was prepared. The tire included four straight main grooves including a pair of center main grooves extending in the tire circumferential direction and a pair of shoulder main grooves each extending in the tire circumferential direction on the outside of the corresponding center main groove, five land portions defined by the main grooves, and a plurality of lug grooves formed between two of the main grooves and communicating with the main grooves at both sides thereof.

Additionally, tires of Comparative Examples were prepared. The tire of Comparative Example 1 had a configuration identical to that of Example 1 except that all the main grooves were straight and that the bent portions of the lug grooves, the narrow grooves, and the raised bottom portions in the bent portions of the lug grooves were not formed. The tire of Comparative Example 2 had a configuration identical to that of Example 1 except that the bent portions of lug grooves, the narrow grooves, and the raised bottom portions in the bent portions of the lug grooves were not formed. The tire of Comparative Example 3 had a configuration identical to that of Example 1 except that the raised bottom portions in the bent portions of the lug grooves were not formed.

In Examples 1 to 9 and Comparative Examples 1 to 3, the inclination angle $\alpha$ of the lug grooves having the bent portions, the depth Ds of the narrow grooves, the depth Dc of the center main grooves, the gap d1 between the narrow grooves and the center main grooves, the width d2 of the land portions having the narrow grooves, the depth Dx of the bent portions at the raised bottom portions, and the depth Dr of the lug grooves were set as shown in Table 1.

These test tires were evaluated for steering stability on dry road surfaces, steering stability on wet road surfaces, and uneven wear resistance according to the following evaluation methods. The results are also shown in Table 1.

Steering Stability on Dry Road Surfaces:

The sensory evaluations by panelists were conducted on dry road surfaces under conditions in which the test tires were assembled on wheels having a rim size of 17×7.5 J, mounted on a front-wheel drive vehicle of 2400 cc engine displacement, and the air pressures (F/R) after warm-up were set to 230 kPa/220 kPa. Evaluation results were expressed as index values with the value of the Conventional Example being defined as 100. Larger index values indicate superior steering stability on dry road surfaces.

Steering Stability on Wet Road Surfaces:

The lap times were measured on a test course constituted by paved roads in rainy weather under conditions in which the test tires were assembled on wheels having a rim size of 17×7.5 J, mounted on a front-wheel drive vehicle of 2400 cc engine displacement, and the air pressures (F/R) after warm-up were set to 230 kPa/220 kPa. The evaluation results were expressed, using the reciprocals of the measurement values, as index values with the value of the Conventional Example being defined as 100. Larger index values indicate superior steering stability on wet road surfaces.

Uneven Wear Resistance:

The amounts of wear of the center main grooves and the shoulder main grooves were measured to determine the level differences after 10000 km of traveling on a test course under conditions in which the test tires were assembled on wheels having a rim size of 17×7.5 J, mounted on a front-wheel drive vehicle of 2400 cc engine displacement, and the air pressures (F/R) after warm-up were set to 230 kPa/220 kPa. The evaluation results were expressed, using the reciprocals of the level differences, as index values with the value of the Conventional Example being defined as 100. Larger index values indicate superior uneven wear resistance.

TABLE 1

|  | Conventional Example | Comparative Example 1 | Comparative Example 2 | Comparative Example 3 |
|---|---|---|---|---|
| Presence of zigzag-shaped center main groove | No | No | Yes | Yes |
| Presence of bent portions of lug grooves and narrow grooves | No | No | No | Yes |
| Presence of raised bottom portions in bent portions of lug grooves | No | No | No | No |
| Inclination angle α (°) of lug grooves having bent portions | — | — | — | 50 |
| Depth Ds (mm) of narrow grooves | — | — | — | 3.2 |
| Depth Dc (mm) of center main grooves | 8.0 | 8.0 | 8.0 | 8.0 |
| Gap d1 (mm) between narrow grooves and center main groove | — | — | — | 6.2 |
| Width d2 (mm) of land portion having narrow grooves | 23 | 23 | 23 | 23 |
| Depth Dx (mm) of bent portions at raised bottom portions | — | — | — | — |
| Depth Dr (mm) of lug grooves | 5.0 | 5.0 | 5.0 | 5.0 |
| Steering stability (index) on dry road surfaces | 100 | 104 | 104 | 103 |
| Steering stability (index) on wet road surfaces | 100 | 105 | 108 | 112 |
| Uneven wear resistance (index) | 100 | 100 | 100 | 103 |

|  | Example 1 | Example 2 | Example 3 | Example 4 | Example 5 |
|---|---|---|---|---|---|
| Presence of zigzag-shaped center main groove | Yes | Yes | Yes | Yes | Yes |
| Presence of bent portions of lug grooves and narrow grooves | Yes | Yes | Yes | Yes | Yes |
| Presence of raised bottom portions in bent portions of lug grooves | Yes | Yes | Yes | Yes | Yes |
| Inclination angle α (°) of lug grooves having bent portions | 50 | 25 | 75 | 50 | 50 |
| Depth Ds (mm) of narrow grooves | 3.2 | 3.2 | 3.2 | 0.8 | 4.0 |
| Depth Dc (mm) of center main grooves | 8.0 | 8.0 | 8.0 | 8.0 | 8.0 |
| Gap d1 (mm) between narrow grooves and center main groove | 6.2 | 6.2 | 6.2 | 6.2 | 6.2 |
| Width d2 (mm) of land portion having narrow grooves | 23 | 23 | 23 | 23 | 23 |
| Depth Dx (mm) of bent portions at raised rottom portions | 3.0 | 3.0 | 3.0 | 3.0 | 3.0 |
| Depth Dr (mm) of lug grooves | 5.0 | 5.0 | 5.0 | 5.0 | 5.0 |
| Steering stability (index) on dry road surfaces | 105 | 103 | 104 | 106 | 104 |
| Steering stability (index) on wet road surfaces | 110 | 110 | 110 | 109 | 109 |
| Uneven wear resistance (index) | 109 | 109 | 109 | 106 | 108 |

|  | Example 6 | Example 7 | Example 8 | Example 9 |
|---|---|---|---|---|
| Presence of zigzag-shaped center main groove | Yes | Yes | Yes | Yes |
| Presence of bent portions of lug grooves and narrow grooves | Yes | Yes | Yes | Yes |
| Presence of raised bottom portions in bent portions of lug grooves | Yes | Yes | Yes | Yes |
| Inclination angle α (°) of lug grooves having bent portions | 50 | 50 | 50 | 50 |
| Depth Ds (mm) of narrow grooves | 3.2 | 3.2 | 3.2 | 3.2 |
| Depth Dc (mm) of center main grooves | 8.0 | 8.0 | 8.0 | 8.0 |
| Gap d1 (mm) between narrow grooves and center main groove | 2.3 | 9.2 | 6.2 | 6.2 |
| Width d2 (mm) of land portion having narrow grooves | 23 | 23 | 23 | 23 |
| Depth Dx (mm) of bent portions at raised bottom portions | 3.0 | 3.0 | 0.5 | 3.5 |
| Depth Dr (mm) of lug grooves | 5.0 | 5.0 | 5.0 | 5.0 |
| Steering stability (index) on dry road surfaces | 104 | 107 | 106 | 104 |
| Steering stability (index) on wet road surfaces | 112 | 110 | 109 | 111 |
| Uneven wear resistance (index) | 106 | 106 | 109 | 108 |

As can be seen from Table 1, the tires of Examples 1 to 9 were improved, as compared with the tire of Conventional Example, in steering stability on both dry and wet road surfaces and, further, in uneven wear resistance. Additionally, the tires of Examples 1 to 9 also showed excellent results compared with Comparative Examples 1 to 3.

The invention claimed is:

1. A pneumatic tire, comprising:
a tread pattern including a tread portion having an annular shape and extending in a tire circumferential direction;
a pair of sidewall portions disposed on both sides of the tread portion;
a pair of bead portions disposed inward of the sidewall portions in a tire radial direction;
a center main groove extending in the tire circumferential direction and a shoulder main groove extending in the tire circumferential direction on the outside of the center main groove, formed in the tread portion;
a land portion defined between the center main groove and the shoulder main groove;
a plurality of lug grooves disposed in the land portion, extending inward in a tire lateral direction from the shoulder main groove, and terminating without communicating with the center main groove, wherein a side of the land portion defined by the center main groove is uninterrupted by lug grooves;
a bent portion bending from a terminating end of each of the plurality of lug grooves toward one side in the tire circumferential direction, wherein the plurality of lug grooves incline from the shoulder main groove toward a second side in the tire circumferential direction opposite the one side, a bent portion length in an extending direction of the bent portion being shorter than a lug groove length in an extending direction of the lug grooves; and
a raised bottom portion included in the bent portion, creating a level difference with respect to each lug groove of the plurality of lug grooves, and being shallower than each lug groove of the plurality of lug grooves;
wherein an other land portion is defined between an other center main groove and an other shoulder main groove on an opposite side of a tire equator as the land portion, the other land portion being configured without lug grooves having the bent portion.

2. The pneumatic tire according to claim 1, wherein a depth Dx of the bent portion at the raised bottom portion and a depth Dr of each lug groove satisfies-a relationship of $0.10 \times Dr \leq Dx \leq 0.70 \times Dr$.

3. The pneumatic tire according to claim 1, wherein
the center main groove has a zigzag shape extending in the tire circumferential direction,
a plurality of narrow grooves intermittently extending in the tire circumferential direction without communicating with the bent portion are formed in the land portion, and
the plurality of narrow grooves are substantially parallel with the center main groove having the zigzag shape.

4. The pneumatic tire according to claim 3, wherein a depth Ds of the plurality of narrow grooves and a depth Dc of the center main groove having the zigzag shape satisfy a relationship of $0.10 \times Dc \leq Ds \leq 0.50 \times Dc$.

5. The pneumatic tire according to claim 3, wherein a gap d1 between the plurality of narrow grooves and the center main groove having the zigzag shape in a tire axial direction and a width d2 of the land portion in the tire axial direction satisfy a relationship of $0.10 \times d2 \leq d1 \leq 0.40 \times d2$.

6. The pneumatic tire according to claim 1, wherein an inclination angle α of the plurality of lug grooves each having the bent portion with respect to the tire circumferential direction is within a range of from 25° to 75°.

7. The pneumatic tire according to claim 2, wherein
the center main groove has a zigzag shape extending in the tire circumferential direction,
a plurality of narrow grooves intermittently extending in the tire circumferential direction without communicating with the bent portion are formed in the land portion, and
the plurality of narrow grooves are substantially parallel with the center main groove having the zigzag shape.

8. The pneumatic tire according to claim 7, wherein a depth Ds of the plurality of narrow grooves and a depth Dc of the center main groove having the zigzag shape satisfy a relationship of $0.10 \times Dc \leq Ds \leq 0.50 \times Dc$.

9. The pneumatic tire according to claim 8, wherein a gap d1 between the plurality of narrow grooves and the center main groove having the zigzag shape in a tire axial direction and a width d2 of the land portion in the tire axial direction satisfy a relationship of $0.10 \times d2 \leq d1 \leq 0.40 \times d2$.

10. The pneumatic tire according to claim 9, wherein an inclination angle α of the plurality of lug grooves each having the bent portion with respect to the tire circumferential direction is within a range of from 25° to 75°.

11. The pneumatic tire according to claim 7, wherein a gap d1 between the plurality of narrow grooves and the center main groove having the zigzag shape in a tire axial direction and a width d2 of the land portion in the tire axial direction satisfy a relationship of $0.10 \times d2 \leq d1 \leq 0.40 \times d2$.

12. The pneumatic tire according to claim 11, wherein an inclination angle α of the plurality of lug grooves each having the bent portion with respect to the tire circumferential direction is within a range of from 25° to 75°.

* * * * *